US010927281B2

(12) United States Patent
Amanullah et al.

(10) Patent No.: US 10,927,281 B2
(45) Date of Patent: Feb. 23, 2021

(54) LOST CIRCULATION MATERIAL (LCM) PILL FOR PARTIAL LOSS CONTROL

(71) Applicant: Saudi Arabian Oil Company, Dhahran (SA)

(72) Inventors: Md Amanullah, Dhahran (SA); Turki Al-Subaie, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/375,195

(22) Filed: Apr. 4, 2019

(65) Prior Publication Data
US 2020/0317980 A1    Oct. 8, 2020

(51) Int. Cl.
*C09K 8/24*    (2006.01)
*C09K 8/035*    (2006.01)
*C09K 8/03*    (2006.01)

(52) U.S. Cl.
CPC .............. *C09K 8/035* (2013.01); *C09K 8/032* (2013.01); *C09K 2208/08* (2013.01)

(58) Field of Classification Search
CPC ...... C09K 8/16; C09K 2208/08; C09K 8/003; C09K 8/035; C09K 8/46; C09K 8/40; C09K 8/426; C09K 8/487; C09K 2208/12; C09K 8/424; C09K 8/44; C09K 8/467; C09K 8/508; C09K 8/516; C09K 2208/34; C09K 8/08; C09K 8/506; C09K 8/473; C09K 8/5086; C09K 8/512; C09K 8/514; C09K 2208/04; C09K 2208/32; C09K 8/032; C09K 8/04; C09K 8/22; C09K 8/28; C09K 8/36; C09K 8/5045; C09K 8/665; C09K 8/72; C09K 8/74; C09K 8/80; C09K 8/805; C09K 208/10; C09K 8/03; C09K 8/06; C09K 8/24; C09K 8/32; C09K 8/48; C09K 8/501; C09K 8/528; C09K 8/572; C09K 8/5756; C09K 8/62; C09K 2208/26; C09K 8/12; C09K 8/145; C09K 8/20; C09K 8/42; C09K 8/428; C09K 8/493; C09K 8/52; C09K 8/565; C09K 8/575; C09K 8/5758; C09K 8/584; C09K 8/602; C09K 8/607; C09K 8/64; C09K 8/68; C09K 8/845; C09K 8/86; C09K 2208/06; C09K 2208/18; C09K 2208/20; C09K 2208/22; C09K 8/02; C09K 8/05; C09K 8/10; C09K 8/18; C09K 8/265; C09K 8/34; C09K 8/50; C09K 8/5083; C09K 8/532; C09K 8/56; C09K 8/58; C09K 8/582; C09K 8/588; C09K 8/60; C09K 8/685; C09K 8/70; C09K 8/703; C09K 8/82; C09K 8/885; C09K 8/94; E21B 21/003; E21B 33/138; E21B 33/14; E21B 47/06; E21B 33/13; E21B 43/267; E21B 21/08; E21B 41/00; E21B 44/00; E21B 21/00; E21B 21/062; E21B 33/16; E21B 43/26; E21B 47/13; E21B 41/0085; E21B 47/005; E21B 47/18; E21B 47/00; E21B 7/15; E21B 10/00; E21B 17/01; E21B 17/02; E21B 21/001; E21B 21/002; E21B 21/063; E21B 21/106; E21B 29/02; E21B 29/10; E21B 33/12; E21B 33/1208; E21B 41/02; E21B 43/04; E21B 43/086; E21B 43/105; E21B 43/25; E21B 43/261; E21B 44/02; E21B 47/002; E21B 47/24; E21B 49/003; E21B 49/006; E21B 17/00; E21B 17/028; E21B 17/1042; E21B 17/20; E21B 19/008; E21B 19/16; E21B 1/00; E21B 21/103; E21B 23/06; E21B 28/00; E21B 33/06; E21B 33/061; E21B 33/085; E21B 33/124; E21B 33/127; E21B 33/128; E21B 33/1293; E21B 33/134; E21B 34/02; E21B 34/04; E21B 34/06; E21B 34/10; E21B 34/14; E21B 36/04; E21B 37/00; E21B 37/02; E21B 3/04; E21B 41/0057; E21B 41/0092; E21B 43/025; E21B 43/08; E21B 43/103; E21B 43/116; E21B 43/117; E21B 43/14; E21B 43/16; E21B 43/162; E21B 43/255; E21B 43/305; E21B 43/40;

(Continued)

(56) References Cited

U.S. PATENT DOCUMENTS 3,078,920 A    2/1963    Brink
3,448,800 A    6/1969    Parker et al.

(Continued)

FOREIGN PATENT DOCUMENTS

WO    2015057244 A1    4/2015
WO    2016019415 A1    2/2016

(Continued)

OTHER PUBLICATIONS

Product datasheet Soluflake, 2018.*

(Continued)

*Primary Examiner* — Kumar R Bhushan
(74) *Attorney, Agent, or Firm* — Bracewell LLP; Constance G. Rhebergen; Brian H. Tompkins (57) ABSTRACT

A date tree product lost circulation material (LCM) is provided. The date tree product LCM includes date tree seed particles, date tree trunk fibers, an acid-soluble particulate material, marble particles, flaked calcium carbonate, and polymer fibers. The LCM may be mixed with a carrier fluid, such as a drilling mud, to form a fluid pill. Methods of lost circulation control using the date tree product LCM and manufacture of the date tree product LCM are also provided.

16 Claims, 5 Drawing Sheets

(58) Field of Classification Search
CPC .... E21B 47/007; E21B 47/017; E21B 47/022; E21B 47/024; E21B 47/04; E21B 47/047; E21B 47/07; E21B 47/10; E21B 47/11; E21B 47/14; E21B 47/22; E21B 47/26; E21B 49/008; E21B 49/08; E21B 49/0875; E21B 49/088; E21B 7/04
See application file for complete search history.

(56) References Cited

U.S. PATENT DOCUMENTS

| | | | |
|---|---|---|---|
| 3,909,421 | A | 9/1975 | Gaddis |
| 9,932,510 | B2 | 4/2018 | Walker et al. |
| 9,957,433 | B2 | 5/2018 | Amanullah et al. |
| 10,093,845 | B2 | 10/2018 | Arias Prada et al. |
| 10,240,411 | B1 | 3/2019 | Amanullah |
| 10,266,742 | B1 | 4/2019 | Amanullah et al. |
| 10,323,170 | B1 | 6/2019 | Amanullah et al. |
| 10,329,470 | B1 | 6/2019 | Amanullah et al. |
| 10,392,549 | B2 | 8/2019 | Amanullah et al. |
| 10,414,965 | B2 | 9/2019 | Amanullah |
| 10,479,920 | B2 | 11/2019 | Amanullah et al. |
| 10,494,558 | B2 | 12/2019 | Amanullah |
| 10,513,647 | B2 | 12/2019 | Amanullah |
| 10,519,357 | B2 | 12/2019 | Amanullah |
| 10,597,575 | B2 | 3/2020 | Amanullah et al. |
| 2016/0333247 | A1* | 11/2016 | Whitfill .................. C09K 8/032 |
| 2017/0058180 | A1 | 3/2017 | Hossain et al. |
| 2017/0137688 | A1 | 5/2017 | Amanullah |
| 2017/0166795 | A1* | 6/2017 | Walker .................. C09K 8/68 |
| 2018/0002589 | A1* | 1/2018 | Amanullah ............ C09K 8/035 |
| 2018/0016483 | A1 | 1/2018 | Amanullah |
| 2018/0171200 | A1 | 6/2018 | Amanullah |
| 2018/0201819 | A1 | 7/2018 | Amanullah |
| 2019/0177593 | A1 | 6/2019 | Amanullah |
| 2019/0177594 | A1 | 6/2019 | Amanullah |
| 2019/0177595 | A1 | 6/2019 | Amanullah |
| 2019/0185732 | A1 | 6/2019 | Amanullah |
| 2019/0194519 | A1 | 6/2019 | Amanullah |
| 2019/0233705 | A1 | 8/2019 | Amanullah et al. |
| 2019/0241787 | A1 | 8/2019 | Amanullah et al. |
| 2019/0241788 | A1 | 8/2019 | Amanullah et al. |
| 2019/0270924 | A1 | 9/2019 | Amanullah |
| 2019/0292860 | A1 | 9/2019 | Amanullah |
| 2019/0292861 | A1 | 9/2019 | Amanullah |
| 2019/0375973 | A1 | 12/2019 | Amanullah |
| 2020/0002592 | A1 | 1/2020 | Amanullah |
| 2020/0079987 | A1 | 3/2020 | Amanullah |
| 2020/0079988 | A1 | 3/2020 | Amanullah |

FOREIGN PATENT DOCUMENTS

| | | |
|---|---|---|
| WO | 2017087434 A1 | 5/2017 |
| WO | 2018118833 A1 | 6/2018 |
| WO | 2018119012 A1 | 6/2018 |

OTHER PUBLICATIONS

Product datasheet Baraflake, 2016.*
International Search Report and Written Opinion for International Application No. PCT/US2020/025737 (SA51003PCT) dated Jul. 1, 2020; pp. 1-15.
U.S. Appl. No. 16/375,184, filed Apr. 4, 2019 titled "Lost Circulation Material (LCM) Pill for Total Loss Control" (SA51002).
U.S. Appl. No. 16/375,184, filed Apr. 4, 2019 titled "Lost Circulation Material (LCM) Pill for Total Loss Control".

* cited by examiner

LOST CIRCULATION MATERIAL (LCM) PILL FOR PARTIAL LOSS CONTROL

BACKGROUND

Field of the Disclosure

The present disclosure generally relates to controlling lost circulation in a wellbore during drilling with a drilling fluid.

Description of the Related Art

Loss of drilling fluid (which may include or be referred to as "lost circulation") is one of the frequent challenges encountered during drilling operations. Such fluid loss occurs when drilling fluid (such as drilling mud) pumped into a well returns partially or does not return to the surface. While some fluid loss is expected, excessive fluid loss is not desirable from a safety, an economical, or an environmental point of view. Loss of drilling fluid is associated with problems with well control, borehole instability, pipe sticking, unsuccessful production tests, poor hydrocarbon production after well completion, and formation damage due to plugging of pores and pore throats by mud particles. In extreme cases, fluid loss problems may force abandonment of a well.

Fluid loss can occur in various formations, such as naturally fractured formations, cavernous formations, and highly permeable formations (that is, "super-K" formations that produce >500 barrels per day per foot of thickness (BLPD/ft). The extent of the fluid loss and the ability to prevent or control the fluid loss depends on the type of formation in which the fluid loss occurs.

SUMMARY

A wide variety of loss circulation materials have been used or proposed to prevent or mitigate lost circulation problems. Existing LCMs may be divided into different categories based on their physical and chemical properties and functional mechanisms. Physically, existing LCMs may be fibrous, flaky, particulate, specially shaped, or a combination thereof.

Different types of loss control materials (LCMs) are used to control partial and total loss of circulation. However, existing LCMs are not suitable to control partial and total loss control in highly permeable, fractured, and vugular loss zones. Existing LCM products (including compositions, blends, engineered pills and slurries, and proprietary formulations) have various combinations of technical limitations, variable success rate, placement difficulties, and other disadvantages that may inhibit effective sealing and plugging of loss zones for problem-free and economic drilling operations. Additionally, existing LCM products may raise environmental concerns with regards to use and disposal. Thus, there is a need for novel and improved LCM pills with improved sealing and plugging performance, ease of placement, and eco-friendly properties that do not cause damage or degradation to the surrounding environments, ecosystems and the habitats.

Embodiments of the disclosure generally relate to an improved LCM pill for reducing or preventing partial loss of circulation of whole mud encountered in highly permeable and unconsolidated formations. As used herein, the term "partial loss" refers to a loss of less than 100 barrels (bbls) per hour (bbls/hr). As used herein, the term "highly permeable" formation includes "super-k' formations, with the term "super-k" describing a formation that may produce greater than 500 barrels per day per foot of thickness (BLPD/ft).

In one embodiment, a lost circulation material (LCM) composition is provided. The LCM composition includes a plurality of fibers formed from date tree trunks, the plurality of fibers having a D50 particle size distribution in the range of 800 microns to 1000 microns, and a plurality of particles formed from date tree seeds. The LCM composition also includes an acid-soluble particulate material, a plurality of marble particles, a plurality of calcium carbonate flakes, and a plurality of synthetic polymer fibers.

In some embodiments, the LCM composition consists of the plurality of fibers formed from date tree trunks, the plurality of particles formed from date tree seeds, the acid-soluble particulate material, the plurality of marble particles, the plurality of calcium carbonate flakes, and the plurality of synthetic polymer fibers. In some embodiments, the plurality of fibers formed from date tree trunks is an amount in the range of 9.5 pounds-per-barrel (ppb) to 10.5 ppb and the plurality of particles formed from date tree seeds is an amount in the range of 14.25 ppb to 15.75 ppb. In some embodiments, the plurality of marble particles includes a first group of marble particles in an amount in the range of 14.25 ppb to 15.75 ppb, a second group of marble particles in an amount in the range of 19 ppb to 21 ppb; and, a third group of marble particles in an amount in the range of 9.5 ppb to 10.5 ppb. In some embodiments, the plurality of calcium carbonate flakes is an amount in the range of 14.25 ppb to 15.75 ppb and the plurality of synthetic polymer fibers is an amount in the range of 0.19 ppb to 0.21 ppb. In some embodiments, the plurality of particles formed from date tree seeds has a 50 particle size distribution in the range of 1000 microns to 2000 microns. In some embodiments, the plurality of marble particles includes a first group of marble particles having a D50 particle size distribution of 600 microns and a second group of marble particles having a D50 particle size distribution of 150 microns. In some embodiments, the plurality of marble particles includes a third group of marble particles having a D50 particle size of 50 microns. In some embodiments, the plurality of calcium carbonate flakes has a D50 particle size distribution of 850 microns.

In another embodiment, a method to control lost circulation in a lost circulation zone in a wellbore is provided. The method includes introducing a fluid pill into the wellbore such that the fluid pill contacts the lost circulation zone and reduces a rate of lost circulation into the lost circulation zone. The fluid pill includes a carrier fluid and a lost circulation material (LCM). The LCM includes a plurality of fibers formed from date tree trunks, the plurality of fibers having a D50 particle size distribution in the range of 800 microns to 1000 microns, and a plurality of particles formed from date tree seeds. The LCM also includes an acid-soluble particulate material, a plurality of marble particles, a plurality of calcium carbonate flakes, and a plurality of synthetic polymer fibers.

In some embodiments, the LCM consists of the plurality of fibers formed from date tree trunks, the plurality of particles formed from date tree seeds, the acid-soluble particulate material, the plurality of marble particles, the plurality of calcium carbonate flakes, and the plurality of synthetic polymer fibers. In some embodiments, the carrier fluid is a drilling fluid. In some embodiments, the drilling fluid is a bentonite mud. In some embodiments, the plurality of fibers formed from date tree trunks is an amount in the range of 9.5 pounds-per-barrel (ppb) to 10.5 ppb and the plurality of particles formed from date tree seeds is an amount in the range of 14.25 ppb to 15.75 ppb. In some embodiments, the plurality of marble particles includes a first group of marble particles in an amount in the range of 14.25 ppb to 15.75 ppb, a second group of marble particles in an amount in the range of 19 ppb to 21 ppb; and, a third group of marble particles in an amount in the range of 9.5 ppb to 10.5 ppb. In some embodiments, the plurality of calcium carbonate flakes is an amount in the range of 14.25 ppb to 15.75 ppb and the plurality of synthetic polymer fibers is an amount in the range of 0.19 ppb to 0.21 ppb. In some embodiments, the plurality of particles formed from date tree seeds has a 50 particle size distribution in the range of 1000 microns to 2000 microns. In some embodiments, the plurality of marble particles includes a first group of marble particles having a D50 particle size distribution of 600 microns and a second group of marble particles having a D50 particle size distribution of 150 microns. In some embodiments, the plurality of marble particles includes a third group of marble particles having a D50 particle size of 50 microns. In some embodiments, the plurality of calcium carbonate flakes has a D50 particle size distribution of 850 microns.

In another embodiment, a method of manufacturing a lost circulation material (LCM) composition is provided. The method includes manufacturing the LCM from a mixture by performing the following ordered steps: (a) mixing a plurality of date tree seed particles with an acid-soluble particulate material to form a mixture; (b) mixing a plurality of fibers formed from date tree trunks into the mixture, the plurality of fibers having a D50 particle size distribution in the range of 800 microns to 1000 microns; (c) mixing a first plurality of marble particles into the mixture, the first plurality of marble particles having a D50 particle size distribution of 600 microns; (d) mixing a second plurality of marble particles into the mixture, the second plurality of marble particles having a D50 particle size distribution of 150 microns; (e) mixing a third plurality of marble particles into the mixture, the third plurality of marble particles having a D50 particle size distribution of 50 microns; (f) mixing a plurality of calcium carbonate flakes into the mixture; and (g) mixing a plurality of synthetic polymer fibers into the mixture to form the LCM composition.

In some embodiments, the plurality of fibers formed from date tree trunks is an amount in the range of 9.5 pounds-per-barrel (ppb) to 10.5 ppb and the plurality of particles formed from date tree seeds is an amount in the range of 14.25 ppb to 15.75 ppb. In some embodiments, the first plurality of marble particles is an amount in the range of 14.25 ppb to 15.75 ppb, the second group of marble particles is an amount in the range of 19 ppb to 21 ppb, and the third group of marble particles is an amount in the range of 9.5 ppb to 10.5 ppb. In some embodiments, the plurality of calcium carbonate flakes is an amount in the range of 14.25 ppb to 15.75 ppb and the plurality of synthetic polymer fibers is an amount in the range of 0.19 ppb to 0.21 ppb.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include a date tree product LCM composition (for example, a pill) that includes date tree seed (also referred to as "date seed") particles and date tree waster fibers. The date tree seeds and date tree waste are obtained from the species *Phoenix dactylifera*. It should be appreciated that, in some embodiments, the date tree seeds and trunks may be obtained from genetically modified date trees (that is, genetically modified organisms (GMOs)). The date product LCM composition also includes marble particles, flaked calcium carbonate, and polymer fibers. The date tree product LCM composition also includes an acid-soluble particulate material that may have a synergistic action with the other components of the LCM composition to form seals and plugs in a lost circulation zone.

The date tree product LCM includes date tree seed particles formed from ground date tree seeds. In some embodiments, the date tree seed particles have a D50 size distribution in the range of 1000 microns to 2000 microns. The date tree product LCM composition may include date seed particles in an amount in the range of 14.25 pounds-per-barrel (ppb) to 15.75 ppb. In some embodiments, the date tree product LCM composition may include the date seed particles in an amount of 15 ppb. In some embodiments, the date seed particles may have the sieve sizing shown in Table 1:

TABLE 1

SIEVE SIZING OF DATE SEED PARTICLES

| Mesh No | Micron Size | Percentage | Average Percentage |
| --- | --- | --- | --- |
| 5 | 4000 | 100% Passed | 100% Passed |
| 8 | 2380 | 20-40% Retained | 30 ± 10% Retained |
| 12 | 1680 | 10-30% Retained | 20 ± 10% Retained |
| 20 | 841 | 10-20% Retained | 15 ± 5% Retained |
| 30 | 595 | 10-20% Retained | 15 ± 5% Retained |
| 60 | 250 | 5-15% Retained | 10 ± 5% Retained |
| 100 | 149 | 2-8% Retained | 5 ± 3% Retained |
| Pan | <149 | 2-8% | 5 ± 2% |

The date tree product LCM pill includes date tree waste fibers (that is, fibers generated from date tree waste producing during date production). In some embodiments, the date tree waste is date tree trunks, such that the date tree product LCM composition includes date tree trunk fibers. The date tree trunk fibers (referred to in the disclosure as "coarse" date tree trunk fibers) may have a D50 size distribution in the range of 800 microns to 1000 microns. The date tree product LCM composition includes the date tree waste fibers in an amount in the range of 9.5 ppb to 10.5 ppb. In some embodiments, the date tree product LCM composition may include the date tree waste fibers in an amount of 10 ppb. In some embodiments, the date tree trunk fibers may have the sieve sizing shown in Table 2:

TABLE 2

SIEVE SIZING OF COARSE DATE TREE TRUNK FIBERS

| Mesh Size (Micron) | % Retained |
|---|---|
| 4000 | 0.00 |
| 2000 | 6.35 |
| 1000 | 36.21 |
| 600 | 34.77 |
| 250 | 19.32 |
| 10 | 3.35 |

In some embodiments, the date palm seeds may include untreated date palm seeds and the date tree waste fibers (for example, date tree trunk fibers) may include untreated date tree waste fibers. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the particles. In such embodiments, the date palm seed particles and date tree waste fibers may be manufactured without treating before, during, or after crushing, grinding, drying, or any other processing.

In some embodiments, the acid-soluble particulate material is a particulate material having a size in the range of about 250 microns to about 600 microns. In some embodiments, the date tree product LCM composition may include the acid-soluble particulate material in an amount in the range of about 9.5 ppb to about 10.5 ppb. In some embodiments, the date tree product LCM composition may include the acid-soluble particulate material in an amount of about 10 ppb. The acid-soluble particulate material may be relatively lesser in cost and may be used in a reservoir section of a wellbore. For example, as the acid-soluble particular material is of a lower density than barite or other weighting agents, it may be more easily transported into a lost circulation zone without encountering settlement during the placement of a fluid pill of the LCM composition. The acid solubility may enable the particulate material to be removed via an acid treatment. The removal of the acid soluble particular material (as well as other acid-soluble components of the LCM) may degrade or remove seals and plugs formed by the LCM and restore the flow of hydrocarbons from the formation to the wellbore. In some embodiments, the acid-soluble particulate material is Sure-Seal™ manufactured by Drilling Specialties Company of The Woodlands, Tex., USA.

The date tree product LCM composition includes various sizes of marble particles. The acid solubility of the marble particles may enable the particles to be removed via an acid treatment. The removal of the marble particles (as well as other acid-soluble components of the LCM) may degrade or remove seals and plugs formed by the LCM and restore the flow of hydrocarbons from the formation to the wellbore. Moreover, the marble particles may be less abrasive and less dense than granite or other components, thus being more easily transported into a lost circulation zone and less damaging to pumps and other equipment.

In some embodiments, the date tree product LCM composition includes a first group of marble particles (referred to in the disclosure as "coarse" marble particles) having a D50 size distribution of about 600 microns. In some embodiments, the date product LCM composition includes a second group of marble particles (referred to in the disclosure as "medium" marble particles) having a D50 size distribution of about 150 microns. The date tree product LCM composition may include the first group of marble particles in an amount in the range of 14.25 ppb to 15.75 ppb. In some embodiments, the date tree product LCM composition may include the first group of marble particles in an amount of 15 ppb. The date tree product LCM composition may include the second group of marble particles in an amount in the range of 19 ppb to 21 ppb. In some embodiments, the date tree product LCM composition may include the second group of marble particles in an amount of 20 ppb.

In some embodiments, the date product LCM composition includes a third group of marble particles having a D50 size distribution of 50 microns. The date tree product LCM composition may include the third group of marble particles in an amount in the range of 9.5 ppb to 10.5 ppb. In some embodiments, the date tree product LCM composition may include the third group of marble particles in an amount of 10 ppb. In some embodiments, the third group of marble particles may be Baracarb®-50 manufactured by Halliburton Company of Houston, Tex., USA.

In some embodiments, the date tree product LCM composition includes flaked calcium carbonate. In some embodiments, the flaked calcium carbonate has a D50 size distribution of about 850 microns. The date tree product LCM composition may include flaked calcium carbonate in an amount in the range of 14.25 ppb to 15.75 ppb. In some embodiments, the date tree product LCM composition may include flaked calcium carbonate in an amount of 15 ppb. In some embodiments, the third group of marble particles may be Soluflake™-M manufactured by Baker Hughes of Houston, Tex., USA.

In some embodiments, the date tree product LCM composition includes polymerized synthetic fibers. In some embodiments, the date tree product LCM composition includes polypropylene fibers. The polymerized synthetic fibers may have greater thermal stability and be less susceptible to degradation than biological and natural polymer fibers. The date tree product LCM composition may include polymerized synthetic fiber (for example, polypropylene fibers) in an amount in the range of 0.19 ppb to 0.21 ppb. In some embodiments, the date tree product LCM composition may include polymerized synthetic fiber (for example, polypropylene fibers) in an amount of 0.2 ppb. In some embodiments, the polymerized synthetic fibers may be Sunsweep® manufactured by Sun Drilling Products Corp. of Belle Chasse, La., USA.

In some embodiments, the date tree product LCM composition may be manufactured from a mixture by performing the following steps (a) to (g) in the order below:

(a) mixing the date tree seed particles with the acid-soluble particulate material to form a mixture;

(b) mixing the date tree trunk fibers ("coarse" fibers) into the mixture;

(c) mixing the first group of marble particles ("coarse) into the mixture;

(d) mixing the second group of marble particles ("medium") into the mixture;

(e) mixing the third group of marble particles into the mixture;

(f) mixing the calcium carbonate flakes into the mixture;

(g) mixing the synthetic polymer fibers into the mixture.

As used herein, the term "mixture" may include a mix of solids or solids and liquids. The ordered mixing described in the disclosure may prevent damage and degradation of non-viscous particulate materials of the LCM composition by enabling the mixing of such particulate material in a more viscous mixture.

In some embodiments, the date tree product LCM composition may be used as a date tree product LCM pill and mixed with a carrier fluid. In some embodiments, the date tree product LCM composition may be mixed with a drilling fluid to form the fluid pill. The drilling fluid may be a water-based drilling fluid or an oil-based drilling fluid. In some embodiments, the drilling fluid may be a bentonite mud. The bentonite mud may include water, bentonite, caustic soda, and soda ash. In other embodiments, the carrier fluid may include other drilling fluids and may include hydrocarbon-based fluids such as diesel, mineral oils, or crude oil. In some embodiments, the concentration of the date tree LCM pill in the carrier fluid may in the range of about 90.44 ppb to about 99.96 ppb.

After addition of the date tree product LCM to a carrier fluid (for example, drilling fluid), the LCM pill and carrier fluid may be circulated at a pump rate effective to position the LCM pill into contact with a lost circulation zone in a wellbore, such that the LCM pill alters the lost circulation zone (for example, by sealing, plugging, or blocking pores, pore throats, permeable channels, and gaps) to prevent the loss of whole mud into the lost circulation zones. The date tree product LCM may seal, plug, or block lost circulation zones having various sizes and dimensions of pores, pore throats, permeable channels, and gaps due to the combination of components of the date tree product LCM.

Figure 1:
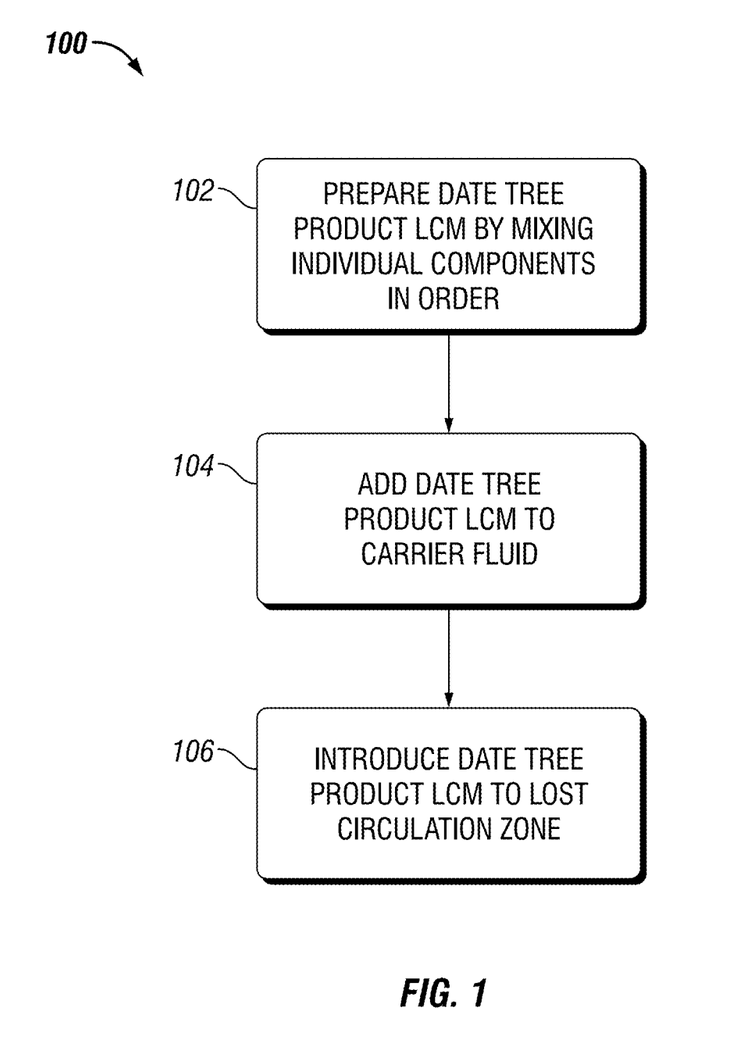
FIG. 1 is a flowchart of a process for the production and use of a date tree product LCM in accordance with embodiments of the disclosure.

FIG. 1 depicts a process 100 for the production and use of a date tree product LCM in accordance with an example embodiment of the disclosure. The date tree product LCM may be prepared at the surface by mixing the individual components of the date tree product LCM (block 102). In some embodiments, the components may be mixed in the following order:

(a) the date tree seed particles with the acid-soluble particulate material to form a mixture;

(b) mixing the date tree trunk fibers ("coarse" fibers) into the mixture;

(c) mixing the first group of marble particles ("coarse") into the mixture;

(d) mixing the second group of marble particles ("medium") into the mixture;

(e) mixing the third group of marble particles into the mixture;

(f) mixing the calcium carbonate flakes into the mixture;

(g) mixing the synthetic polymer fibers into the mixture.

Next, the date tree product LCM may be mixed with a carrier fluid, such as a drilling fluid (block 104), to form a fluid pill.

Next, the date tree product LCM may be introduced into a lost circulation zone (block 106), such as by circulating the LCM at a pump rate effective to position the LCM into contact with a lost circulation zone in a wellbore, such that the LCM alters the lost circulation zone (for example, by entering and blocking pores, pore throats, permeable channels, and gaps in a formation in the lost circulation zone). Accordingly, the date tree product LCM may reduce or prevent the loss of whole mud in the lost circulation zone.

In some embodiments, seals or plugs formed by the date tree product LCM may be degraded and removed via an acid treatment. For example, an acid may be introduced in to the lost circulation zone to contact the seals or plugs and dissolve acid soluble components of the date tree product LCM. The acid may include mineral acids such as hydrochloric acid.

Alternatively, in some embodiments, the date tree product LCM may be added to a circulating drilling fluid, such as a drilling mud, to create an altered drilling fluid having the LCM. The altered drilling fluid may be circulated at a pump rate effective to position the drilling fluid into contact with a lost circulation zone in a wellbore, such that the date tree product LCM alters the lost circulation zone (for example, by entering and blocking pores, pore throats, permeable channels, and gaps in a formation in the lost circulation zone).

Examples

The following examples are included to demonstrate embodiments of the disclosure. It should be appreciated by those of skill in the art that the techniques and compositions disclosed in the example which follows represents techniques and compositions discovered to function well in the practice of the disclosure and thus can be considered to constitute modes for its practice. However, those of skill in the art should in light of the present disclosure appreciate that many changes can be made in the specific embodiments which are disclosed and still obtain a like or a similar result without departing from the spirit and scope of the disclosure.

The following non-limiting example of a date tree product LCM pill was prepared and tested against a conventional LCM pill using a 65 pounds per cubic foot (pcf) bentonite mud. The composition of the 65 pcf bentonite mud is shown in Table 3:

TABLE 3

| COMPOSITION OF 65 PCF BENTONITE MUD | |
|---|---|
| Mud Component | pounds-per-barrel (ppb) |
| Water | 340.67 |
| Bentonite | 25.00 |
| Caustic Soda | 0.25 |
| Soda Ash | 0.25 |

The composition of the date tree product LCM is shown in Table 4, with the median particle size in microns and the concentration in pounds-per-barrel (ppb):

TABLE 4

| COMPOSITION OF DATE TREE PRODUCT LCM PILL | | |
|---|---|---|
| Component | Median Particle Size (D50 Particle size distribution) | Concentration |
| Date seed particles | 1000-2000 | 15 |
| Sure-Seal ™ | 400-600 | 10 |
| Date tree trunk fibers | 800-1000 | 10 |
| Marble particles (coarse) | 600 | 15 |
| Marble particles (medium) | 150 | 20 |

TABLE 4-continued

COMPOSITION OF DATE TREE PRODUCT LCM PILL

| Component | Median Particle Size (D50 Particle size distribution) | Concentration |
|---|---|---|
| Baracarb ®-50 | 50 | 10 |
| Soluflake ® M | 850 | 15 |
| Sunsweep ® | | 0.2 |
| Total Pill Concentration | | 95.2 |
| Carrier Fluid | | Bentonite Mud |

The date seed particles had a median particle size (D50 particle size distribution) in the range of 1000 microns to 2000 microns. The date seeds were prepared by grinding date seeds and sieving the ground date seeds to produce the desired particle sizes. The sieve cut of the date seed particles used in the example date tree product LCM pill is shown in Table 5:

TABLE 5

SIEVE SIZING OF DATE SEED PARTICLES OF EXAMPLE DATE PRODUCT LCM PILL

| Mesh No | Micron Size | Typical Percentage | Average Percentage |
|---|---|---|---|
| 5 | 4000 | 100% Passed | 100% Passed |
| 8 | 2380 | 20-40% Retained | 30 ± 10% Retained |
| 12 | 1680 | 10-30% Retained | 20 ± 10% Retained |
| 20 | 841 | 10-20% Retained | 15 ± 5% Retained |
| 30 | 595 | 10-20% Retained | 15 ± 5% Retained |
| 60 | 250 | 5-15% Retained | 10 ± 5% Retained |
| 100 | 149 | 2-8% Retained | 5 ± 3% Retained |
| Pan | <149 | 2-8% | 5 ± 2% |

The coarse date tree trunk fibers listed in Table 4 had a median particle size (D50 particle size distribution) in the range of 800 microns to 1000 microns. The coarse date tree trunk fibers were prepared by chopping, cleaning and washing, and grinding date tree trunks, and sieving the ground date tree trunks to produce the desired fibers sizes. The sieve cut of the coarse date tree trunk fibers used in the example date tree product LCM pill is shown in Table 6:

TABLE 6

SIEVE SIZING OF COARSE DATE TREE TRUNK FIBERS OF EXAMPLE DATE PRODUCT LCM PILL

| Mesh Size (Micron) | % Retained |
|---|---|
| 4000 | 0.00 |
| 2000 | 6.35 |
| 1000 | 36.21 |
| 600 | 34.77 |
| 250 | 19.32 |
| 10 | 3.35 |

As shown in Table 4, the example date tree product LCM pill includes the following commercially available components: Sure-Seal™ manufactured by Drilling Specialties Company of The Woodlands, Tex., USA; Baracarb®-50 manufactured by Halliburton Company of Houston, Tex., USA; Soluflake™-M manufactured by Baker Hughes of Houston, Tex., USA; and Sunsweep® manufactured by Sun Drilling Products Corp. of Belle Chasse, La., USA.

The composition of the conventional LCM pill is shown in Table 7, with the median particle size in microns and the concentration in pounds-per-barrel (ppb):

TABLE 7

COMPOSITION OF DATE TREE PRODUCT LCM PILL

| Component | Median Particle Size (D50 Particle size distribution) | Concentration |
|---|---|---|
| Nut Plug ® | 1200-1500 | 15 |
| Sure-Seal ™ | 400-600 | 10 |
| Barofiber ® C | 1200-1400 | 10 |
| Marble particles (coarse) | 600 | 15 |
| Marble particles (medium) | 150 | 20 |
| Baracarb ®-50 | 50 | 10 |
| Soluflake ™ M | 850 | 15 |
| Sunsweep ® | | 0.2 |
| Total Pill Concentration | | 95.2 |
| Carrier Fluid | | Bentonite Mud |

As shown in Table 7, the conventional LCM pill includes the following commercially available components: Nut Plug® manufactured by M-I SWACO of Houston, Tex., USA; Barofiber® Coarse manufactured by Halliburton Company of Houston, Tex., USA: Sure-Seal™ manufactured by Drilling Specialties Company of The Woodlands, Tex., USA; Baracarb®-50 manufactured by Halliburton Company of Houston, Tex., USA; Soluflake™-M manufactured by Baker Hughes of Houston, Tex., USA; and Sunsweep® manufactured by Sun Drilling Products Corp. of Belle Chasse, La., USA.

The example date product LCM pill and conventional LCM pill were evaluated using a physical simulation of a highly permeable partial loss zone. 20/40 sand (that is, sand having a sieve cut of 20/40 such that the sand particles have a size range of about 0.841 millimeters (mm) to about 0.420 mm) was used for physical simulation of a partial loss zone using a see-through test cell, associated fixtures, and a compaction pressure of at least 1000 gram-force (gmf). A metal screen having a size of about 250 microns size was used below the sand bed to prevent any loss of sand particles while testing and to create a stable test bed of homogeneous characteristics. The see-through test cell included an exit hole at the bottom of the test cell for release of fluids during testing.

Figure 2:
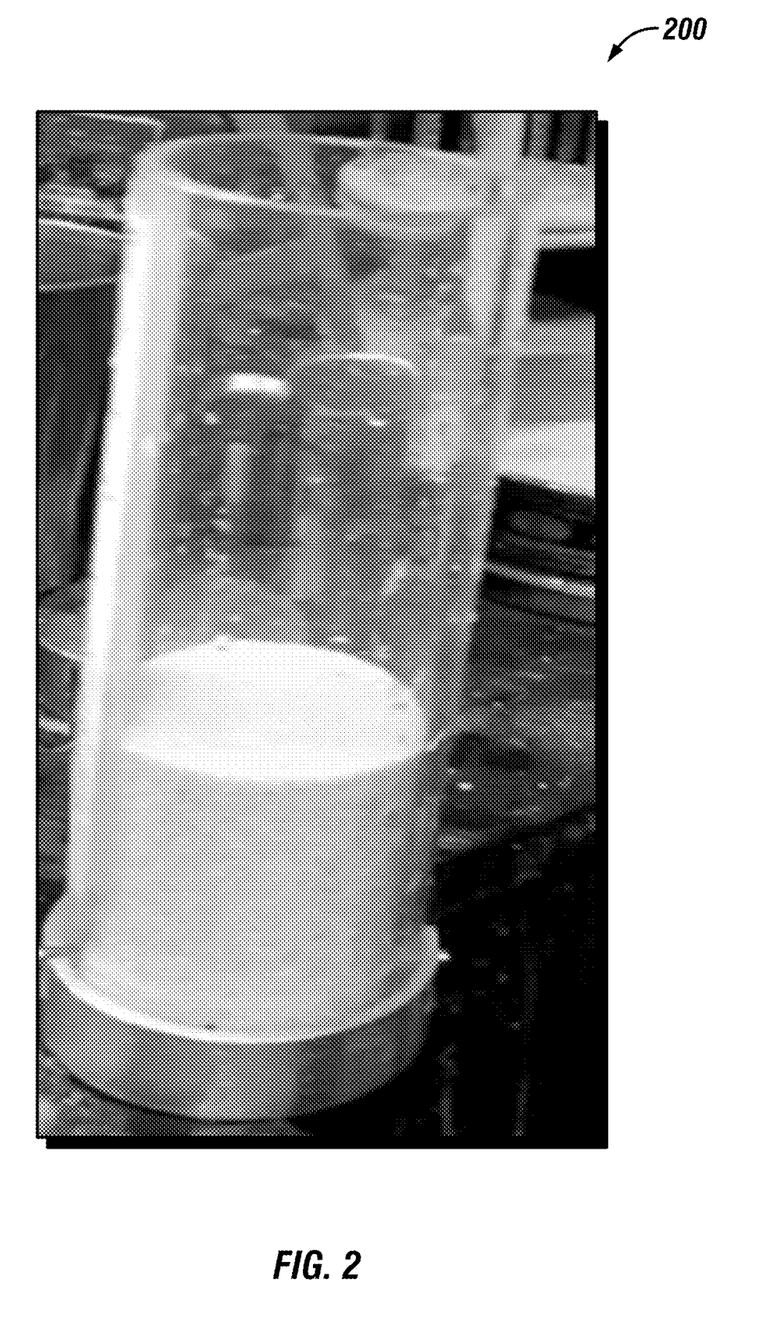
FIG. 2 is a photograph of a see-through test cell and 20/40 sand used to simulate a partial loss zone in accordance with embodiments of the disclosure.

FIG. 2 is a photograph 200 of the see-through test cell and 20/40 sand used to simulate a partial loss zone in accordance with an embodiment of the disclosure. The height of the sand bed was 105 millimeters (mm) and the diameter of the cylindrical sand bed was 76 mm (that is, equal to the inner diameter of the see-through test cell). The test bed was constructed by adding sand in multiple steps followed by water saturation of the sand bed matrix to remove air and simulate a water saturation condition like a subsurface formation. After sand was added to a height slightly above the final height of 105 mm, the sand was compacted by applying an axial load of at least 1000 gmf. The top of the sand bed was leveled using a hand held compactor that has a flat foot at the bottom and a foot long stand attached to it to reach the top of the sand bed.

Samples of the example date tree product LCM pill and conventional LCM pill were prepared using 350 cubic centimeters (cc) of the bentonite mud. To prepare the example date tree product LCM pill, the components were mixed in the order shown in Table 4 using a high speed mixer for a time period of about 4 minutes to about 5 minutes after the addition of each components. After mixing all components of the example date tree product LCM pill, two drops of defoamer were added to remove any air bubbles generated during mixing of the pill components. The defoamer was Barabrine® manufactured by Halliburton Company of Houston, Tex., USA. To prepare the conventional LCM pill, the components were mixed in the order shown in Table 7 using a high speed mixer for a time period of about 4 minutes to about 5 minutes after the addition of each components. After mixing all components of the conventional LCM pill, two drops of defoamer were added to remove any air bubbles generated during mixing of the pill components.

Figure 3:
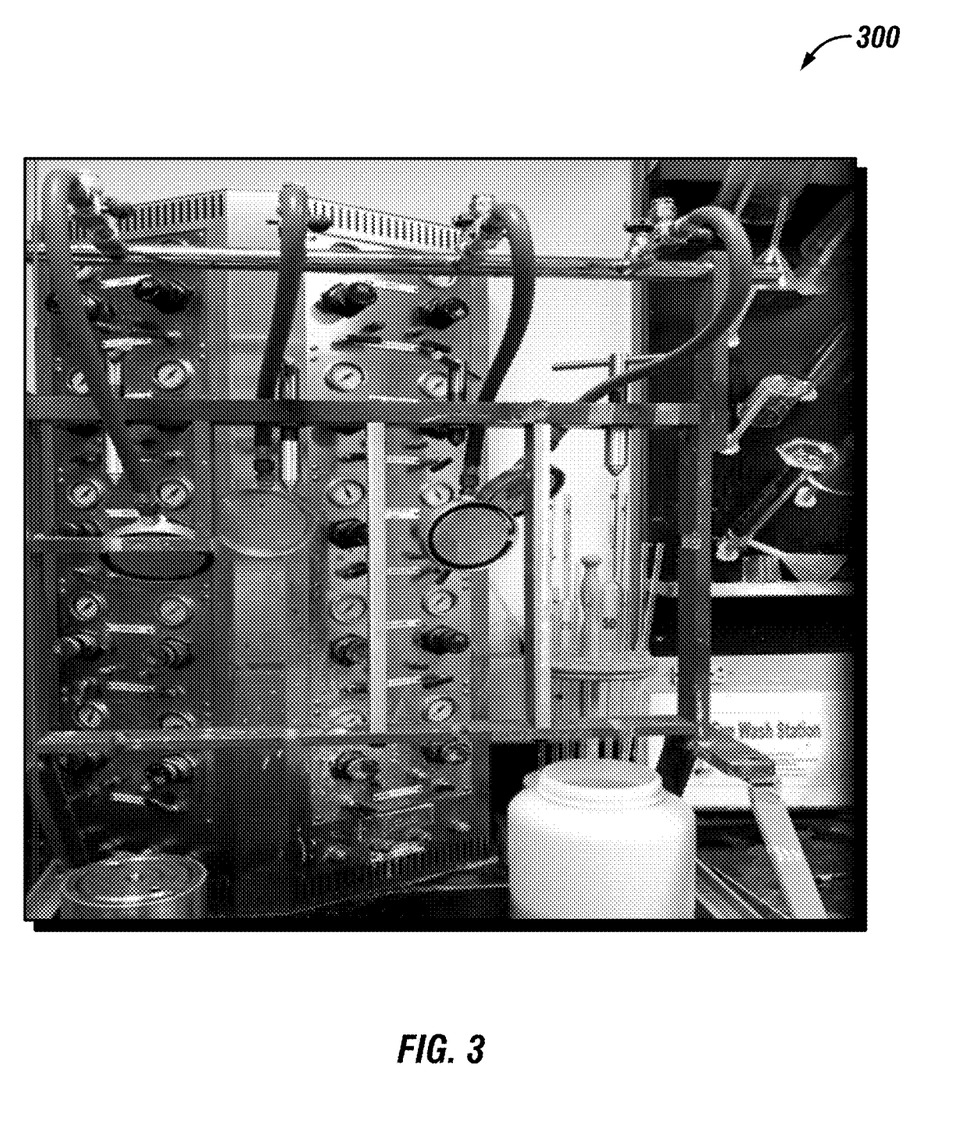
FIG. 3 is a photograph of the specially designed test frame for mounting and pressuring the see-through test cell of FIG. 2 in accordance with embodiments of the disclosure.

The see-through test cell having the sand bed was mounted in a specially designed test frame and connected to a gas pressure line. FIG. 3 is a photograph 300 of the specially designed test frame for mounting and pressuring the see-through test cell. During testing, 100 pounds-per-square inch of pressure was applied to the see-through test cell to simulate an overburden pressure that can trigger a loss of circulation while drilling. Before mounting the test cell in the test frame, the sample LCM pill was slowly poured into the see-through test cell so as to avoid damage to the sand bed and simulate placement of the LCM pill in the vicinity of a loss zone.

After positioning the see-through test cell in the holder of the test frame, the top lid of the test cell connected to the gas pressure line was fixed on top of the test cell. The see-through test cell was observed to record any fluid loss at zero applied pressure. After observation for a time period of about 2 minutes to about 3 minutes, 100 pounds-per-square inch (psi) pressure was applied on top of the test cell to simulate an overburden pressure. A transparent pipe was connected to the exit hole of the see-through test cell and routed to a fluid collection pot.

Figure 4A:
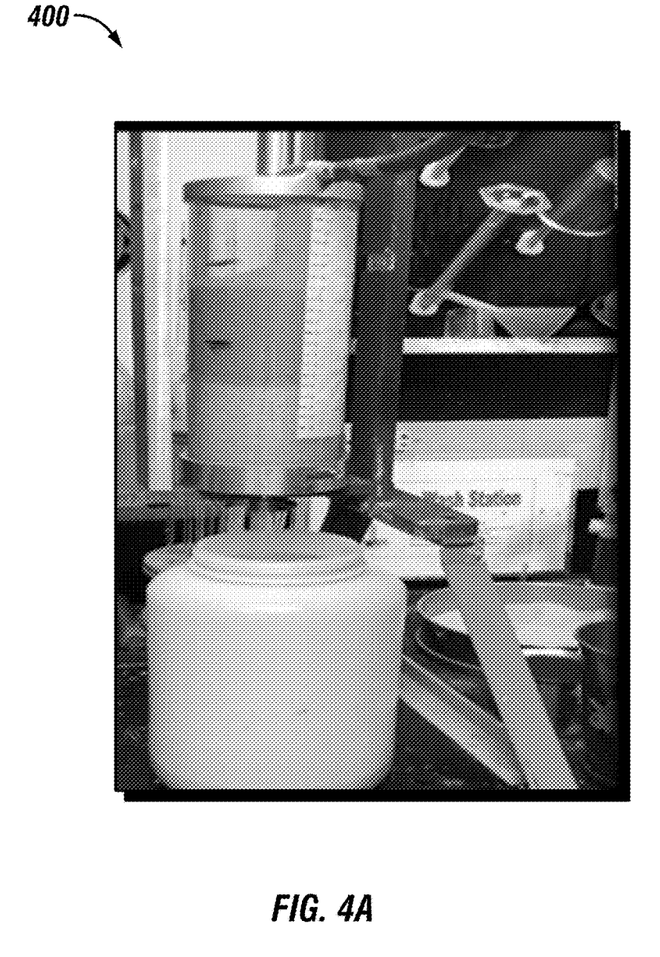
FIGS. 4A and 4B are photographs of the see-through test cell and the example date tree product LCM pill before and after the application of pressure in accordance with embodiments of the disclosure.
Figure 4B:
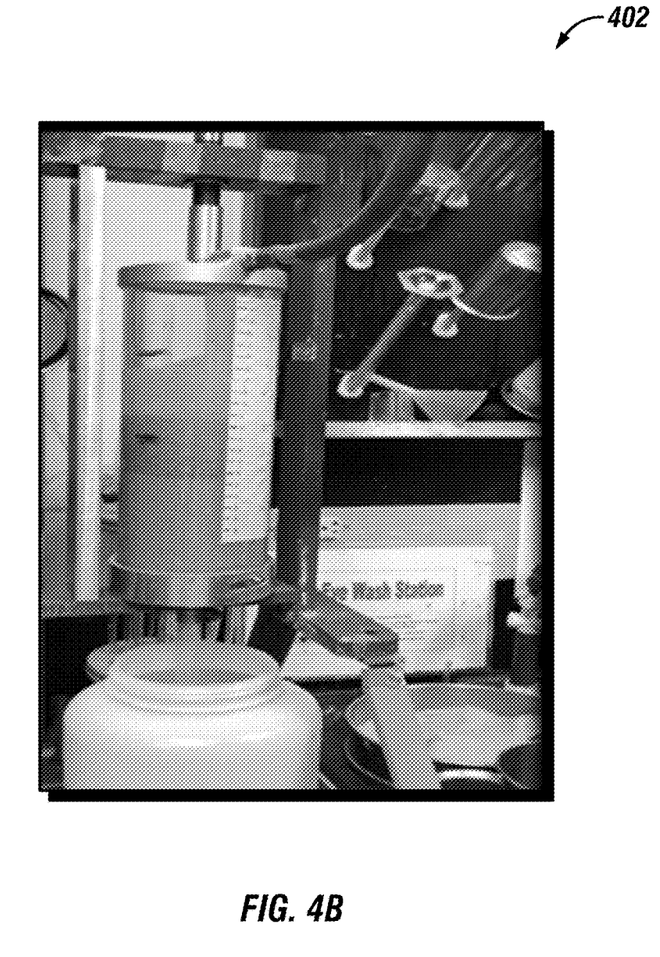

FIGS. 4A and 4B are photographs of the see-through test cell and the example date tree product LCM pill before and after the application of the 100 psi pressure in accordance with an embodiment of the disclosure. FIG. 4A depicts a photograph 400 of the LCM pill slurry and the height of the slurry, and the interface between the LCM pill slurry and the sand bed without any indication of cake formation before the application of the 100 psi pressure. FIG. 4A also shows the exit of clear fluid from the see-through test cell and the absence of any cloudy fluid before the application of the 100 psi pressure.

FIG. 4B depicts a photograph 402 showing a slight drop in the level of the LCM pill slurry before complete cessation of the slurry movement through the sand bed matrix. During the testing, slight filtering of the LCM pill slurry enabled the deposition of a thin cake below the remaining LCM pill slurry and above the top of the sand bed after the application of pressure. As discussed infra, the cake formed by the LCM pill slurry had a significantly smaller thickness than the case formed by the conventional LCM pill slurry. As also shown in FIG. 4B, the fluid exiting the test cell remained clear and none of the carrier fluid (bentonite mud) reached the exit hole due to the effective sealing and blocking of the sand bed matrix by the LCM pull slurry.

The observations during the testing and the photographs depicted in FIGS. 4A and 4B show that the date tree product LCM pill is also capable of preventing a partial loss of circulation. However, as discussed in the disclosure, the date tree product LCM pill demonstrated superior performance than the conventional LCM pill and is thus an improvement for partial loss control over the conventional LCM pill.

Table 8 depicts the test results for the example date tree product LCM pill:

TABLE 8

TEST DATA FOR EXAMPLE DATE TREE PRODUCT LCM PILL

| Applied Pressure (psi) | Measured Parameters | 20/40 Sand Bed |
| --- | --- | --- |
| 100 psi Pressure | Spurt Loss (cc) | 0 |
| | Mud loss (cc) | |
| | Total Leak Off (cc) | |
| | Seal/Plug Thickness | 20-25 mm |
| | Slurry Level Drop | 40-45 mm |
| | Invasion Depth | 50 mm |

The results in Table 8 indicate a partial invasion of the example date tree product LCM pill due to a leakage of some of the date tree product LCM pill slurry into the sand bed matrix. The test data also indicates a thin cake having a thickness of 20-25 mm deposited by the date tree product LCM pill. The formation of the thin cake on the face of a loss zone will decrease the probability and likelihood of pipe sticking problems and thus can act as a strong catalyst for trouble free and economic drilling operation to reduce the non-productive time (NPT) and the total drilling cost significantly.

Moreover, the invasion depth of 50 mm for the example date tree product LCM was smaller than the length of the sand bed (about 105 mm), thus demonstrating efficient sealing and blocking of the sand bed matrix by the example date tree product LCM. The invasion depth of less than 50% of the length of the sand bed demonstrates the ability of the example date tree product LCM to prevent partial loss of circulation.

Figure 5A:
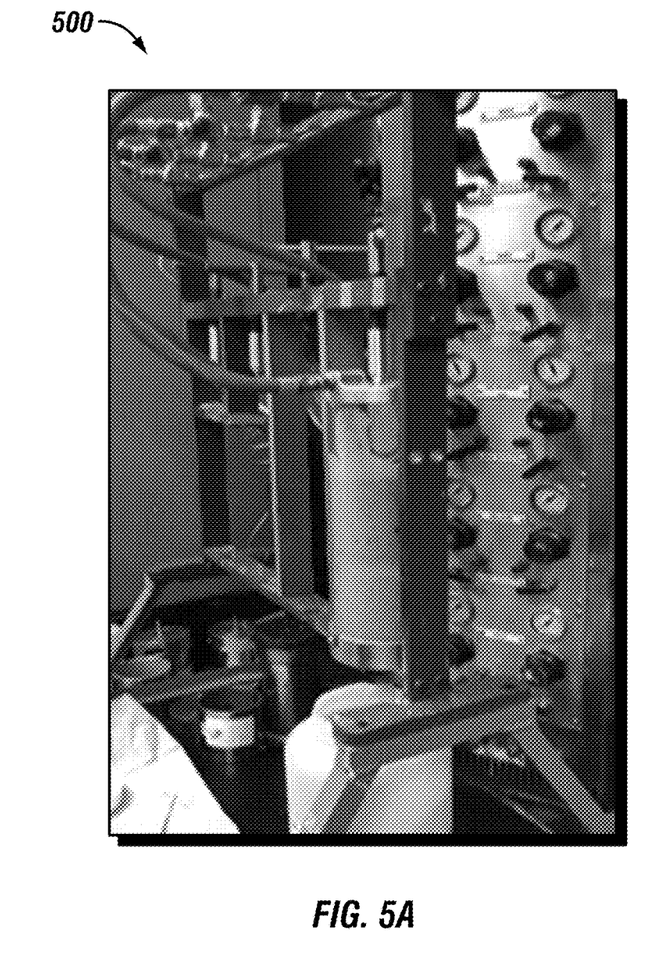
FIGS. 5A and 5B are photographs of the see-through test cell and a conventional LCM pill before and after the application of pressure in accordance with embodiments of the disclosure.
Figure 5B:
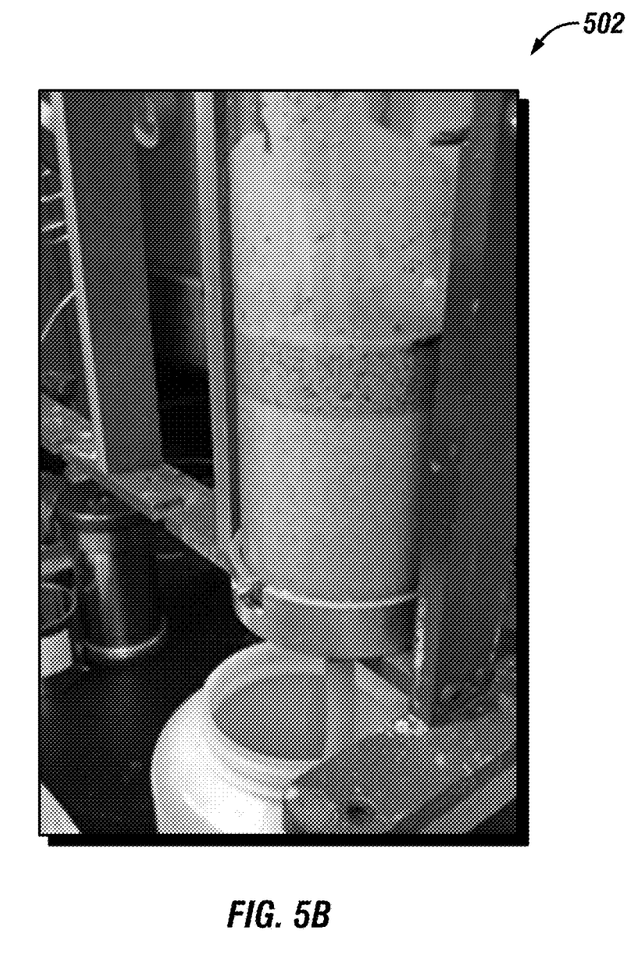

FIGS. 5A and 5B are photographs of the see-through test cell and the conventional LCM pill before and after the application of the 100 psi pressure in accordance with an embodiment of the disclosure. FIG. 5A is a photograph 500 of the conventional LCM pill slurry and the height of the slurry, and the interface between the conventional LCM pill slurry and the sand bed without any indication of cake formation before the application of the 100 psi pressure. FIG. 5A also shows the exit of clear fluid from the see-through test cell and the absence of any cloudy fluid before the application of the 100 psi pressure.

FIG. 5B is a photograph 502 depicting a total drop in the level of the conventional LCM pill slurry and complete loss of the conventional LCM pill slurry through the sand bed matrix. The filtering of the conventional LCM pill slurry allowed for the deposition of a thick cake on the top of the sand bed after the application of pressure. As shown in FIG. 5B, the fluid existing the text cell via the transparent pipe and exit hole became very cloudy due the entry of the muddy carrier fluid.

Table 9 depicts the test data recorded during the testing and evaluation of the conventional LCM pill:

TABLE 9

TEST DATA FOR CONVENTIONAL LCM PILL

| Applied Pressure (psi) | Measured Parameters | 20/40 Sand Bed |
| --- | --- | --- |
| 100 psi Pressure | Spurt Loss (cc) | All 350 cc of slurry lost |
| | Mud loss (cc) | |
| | Total Leak Off (cc) | |
| | Seal/Plug Thickness | 55-65 mm |
| | Slurry Level Drop | Total |
| | Invasion Depth | Beyond the length of the sand bed |

The experiments show the unexpected results produced by the example date tree product LCM pill that includes date tree products as compared to the conventional LCM pill. The example date tree product LCM pill thus shows superior loss control performance than the conventional LCM pill for preventing partial loss of circulation in highly permeable and unconsolidated formations.

The results in Table 9 show a total leakage of the conventional LCM pill slurry over a time period in the range of 2 minutes to 3 minutes. Table 9 also indicates the deposition of a thick cake (having a thickness of 55-65 mm) on the sand bed. The formation of a relative thick cake (as compared to the cake formed by the example date tree product LCM) is an undesirable characteristic of the convention LCM pill for controlling partial loss of circulation in various drilling operations. A deposition of a relatively thick cake significantly increases the probability and likelihood of pipe sticking problems and thus can create a highly complex and difficult drilling, problem with dramatic increase in NPT and the total drilling cost.

The invasion depth indicated in Table 9 of beyond the length of the sand bed also demonstrates the inefficiency of the conventional LCM pill for preventing or controlling partial loss of circulation. The data indicates that the conventional LCM pill would be unable to prevent partial loss of circulation in in highly permeable and unconsolidated formations. The visual observations of the see-through test cell, as shown in the photographs depicted in FIGS. 4A, 4B, 5A and 5B, and the test data provided in Tables 8 and 9 indicate improved performance of the date tree product LCM pill as compared to the conventional LCM pill that does not include date tree products. Thus, the experiments show the unexpected results produced by the example date tree product LCM pill that includes date tree products as compared to the conventional LCM pill that does not include date tree products.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method to control lost circulation in a lost circulation zone in a wellbore, comprising:
   introducing a fluid pill into the wellbore such that the fluid pill contacts the lost circulation zone and reduces a rate of lost circulation into the lost circulation zone, wherein fluid pill comprises a carrier fluid and a lost circulation material (LCM), wherein the LCM consists of:
   a plurality of fibers formed from date tree trunks, the plurality of fibers having a D50 particle size distribution in the range of 800 microns to 1000 microns;
   a plurality of particles formed from date tree seeds;
   an acid-soluble particulate material;
   a plurality of marble particles;
   a plurality of calcium carbonate flakes; and
   a plurality of synthetic polymer fibers.

2. The method of claim 1, wherein the carrier fluid comprises a drilling fluid.

3. The method of claim 2, wherein the drilling fluid comprises a bentonite mud.

4. The method of claim 1, wherein:
   the plurality of marble particles comprises:
      a first group of marble particles in an amount in the range of 14.25 ppb to 15.75 ppb;
      a second group of marble particles in an amount in the range of 19 ppb to 21 ppb; and
      a third group of marble particles in an amount in the range of 9.5 ppb to 10.5 ppb;
   the plurality of calcium carbonate flakes comprises an amount in the range of 14.25 ppb to 15.75 ppb; and
   the plurality of synthetic polymer fibers comprises an amount in the range of 0.19 ppb to 0.21 ppb.

5. The method of claim 1, wherein the plurality of particles formed from date tree seeds has a D50 particle size distribution in the range of 1000 microns to 2000 microns.

6. The method of claim 1, wherein the plurality of marble particles comprise:
   a first group of marble particles having a D50 particle size distribution of 600 microns; and
   a second group of marble particles having a D50 particle size distribution of 150 microns.

7. The method of claim 6, wherein the plurality of marble particles comprises a third group of marble particles having a D50 particle size of 50 microns.

8. The method of claim 1, wherein the plurality of calcium carbonate flakes has a D50 particle size distribution of 850 microns.

9. A method to control lost circulation in a lost circulation zone in a wellbore, comprising:
   introducing a fluid pill into the wellbore such that the fluid pill contacts the lost circulation zone and reduces a rate of lost circulation into the lost circulation zone, wherein fluid pill comprises a carrier fluid and a lost circulation material (LCM), wherein the LCM comprises:
   a plurality of fibers formed from date tree trunks, the plurality of fibers having a D50 particle size distribution in the range of 800 microns to 1000 microns;
   a plurality of particles formed from date tree seeds;
   an acid-soluble particulate material;
   a plurality of marble particles;
   a plurality of calcium carbonate flakes; and
   a plurality of synthetic polymer fibers, wherein
   the plurality of fibers formed from date tree trunks comprises an amount in the range of 9.5 pounds-per-barrel (ppb) to 10.5 ppb, and
   the plurality of particles formed from date tree seeds comprises an amount in the range of 14.25 ppb to 15.75 ppb.

10. The method of claim 9, wherein the carrier fluid comprises a drilling fluid.

11. The method of claim 10, wherein the drilling fluid comprises a bentonite mud.

12. The method of claim 9, wherein:
the plurality of marble particles comprises:
a first group of marble particles in an amount in the range of 14.25 ppb to 15.75 ppb;
a second group of marble particles in an amount in the range of 19 ppb to 21 ppb; and
a third group of marble particles in an amount in the range of 9.5 ppb to 10.5 ppb;
the plurality of calcium carbonate flakes comprises an amount in the range of 14.25 ppb to 15.75 ppb; and
the plurality of synthetic polymer fibers comprises an amount in the range of 0.19 ppb to 0.21 ppb.

13. The method of claim 9, wherein the plurality of particles formed from date tree seeds has a D50 particle size distribution in the range of 1000 microns to 2000 microns.

14. The method of claim 9, wherein the plurality of marble particles comprise:
a first group of marble particles having a D50 particle size distribution of 600 microns; and
a second group of marble particles having a D50 particle size distribution of 150 microns.

15. The method of claim 14, wherein the plurality of marble particles comprises a third group of marble particles having a D50 particle size of 50 microns.

16. The method of claim 9, wherein the plurality of calcium carbonate flakes has a D50 particle size distribution of 850 microns.

* * * * *